May 28, 1968   J. M. FISHER   3,385,438
GRAIN CHAFFER
Filed Feb. 10, 1966   2 Sheets-Sheet 1
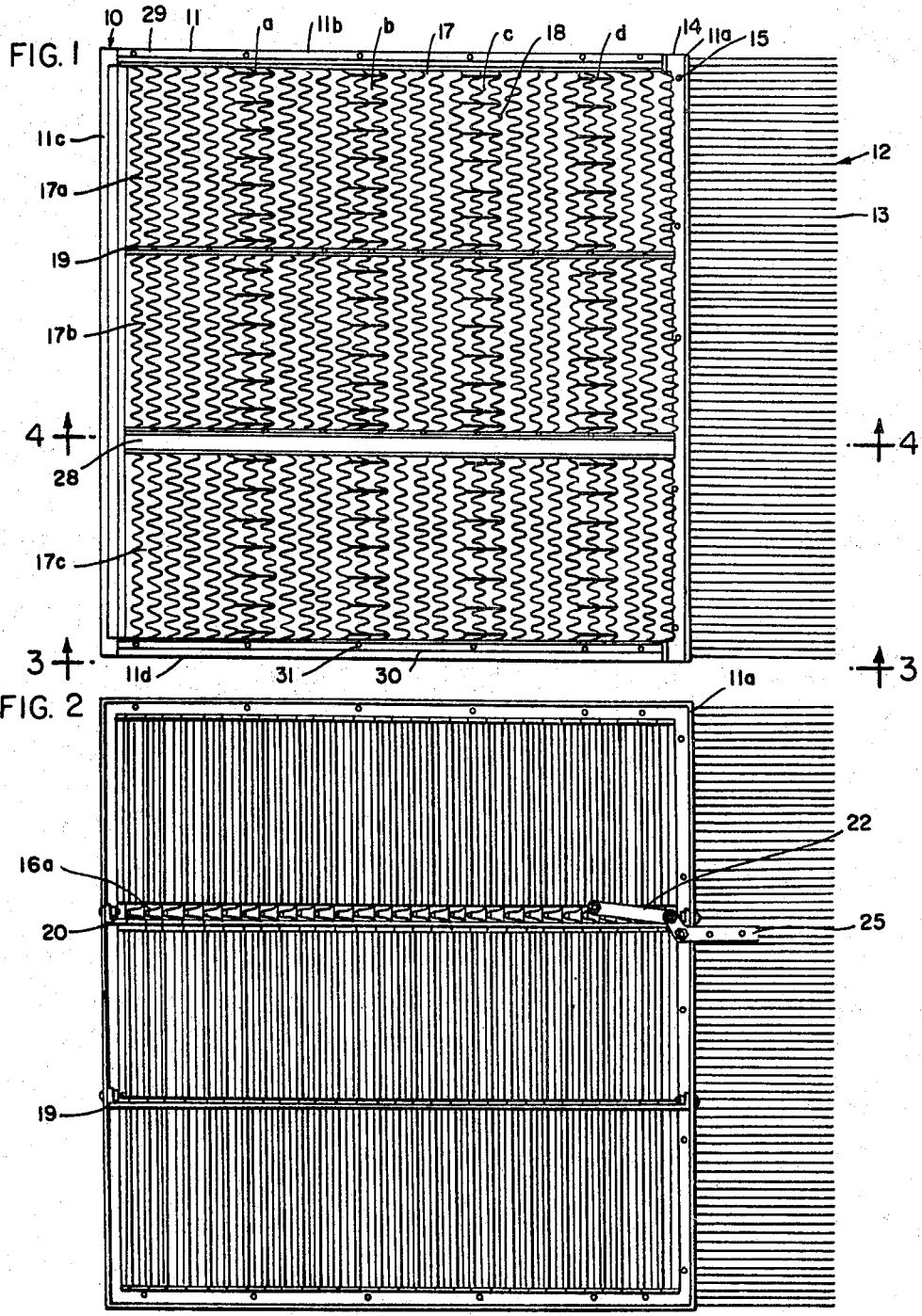
INVENTOR:
JACOB M. FISHER
BY
Dawson, Tilton, Fallon, Lungmus & Alexander
ATT'YS

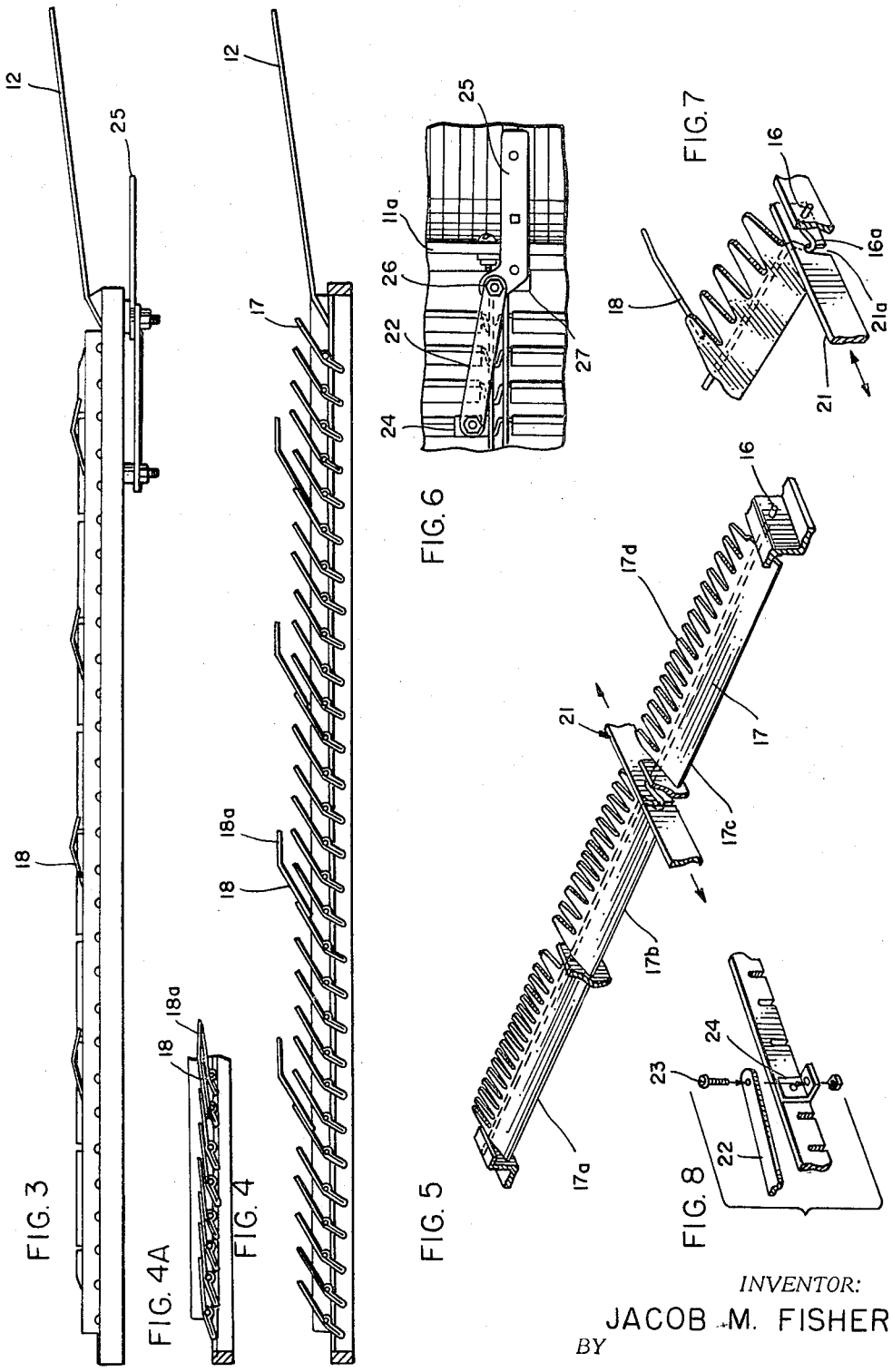

United States Patent Office 3,385,438
Patented May 28, 1968

3,385,438
GRAIN CHAFFER
Jacob M. Fisher, 354 5th St. SW.,
Huron, S. Dak. 57350
Filed Feb. 10, 1966, Ser. No. 526,584
3 Claims. (Cl. 209—394)

ABSTRACT OF THE DISCLOSURE

A chaffer sieve assembly for separating grain from chaff. The assembly includes a frame having a plurality of slats pivotally mounted thereon in parallel, spaced-apart alignment. One edge of each slat is serrated to provide points which extend toward the discharge end of the chaffer, and some of the slats include transversely spaced tines attached to the points thereof. Adjacent tine-bearing slats are separated by at least one non-tine-bearing slat, and each tine includes a first portion which extends from its associated point in general alignment therewith and a second portion extending rearwardly and generally parallel with respect to the plane of the chaffer bed.

Background of the invention

This invention relates to a grain chaffer or chaffer sieve assembly for use on a grain thresher or combine.

The final step performed by a combine or a thresher is the separation of the grain from the chaff. This separation is accomplished by feeding the grain and chaff onto a chaffer sieve. The chaffer acts in the manner of a sieve to allow the small grain particles to fall through the chaffer for collection, while the larger chaff is screened by the chaffer. The chaffer sieve is normally used in conjunction with a wind blower and a vibrator or reciprocator. The wind blower blows upwardly through the chaffer sieve, carrying away loose chaff, and the vibrating movement of the sieve helps move the chaff and grain from the feed end to the discharge end of the sieve. However, the grain frequently is not sufficiently loose from the chaff so that it may fall through the sieve. Consequently, the grain will be carried over the top of the chaffer along with the chaff, and eventually will be blown from the discharge end of the chaffer, thereby resulting in loss of grain. Also, even if the grain is loosened from the chaff, the chaff is frequently matted and lies close to the sieve openings, blocking the passage of grain through the chaffer.

It is, therefore, a principal object of this invention to provide a chaffer which will minimize grain loss. Accordingly, another object of this invention is to provide a chaffer sieve which will separate the grain from the chaff, thereby facilitating the passage of the loose grain through the chaffer.

A further object of the invention is to provide a chaffer which will not become clogged with chaff while in operation.

Still another object of the invention is to provide a chaffer with means both to separate the grain from the chaff and to carry the chaff up and away from the surface of the chaffer so that the loose grain may fall through the chaffer unimpeded by chaff.

Further objects and advantages of the invention will be indicated as the specification proceeds.

The invention is explained in conjunction with the accompanying drawings, in which—

FIG. 1 is a top or plan view of the chaffer;
FIG. 2 is a bottom view of the chaffer;
FIG. 3 is a side view taken on the line 3—3 of FIG. 1 showing the slats of the sieve in a closed position;
FIG. 4 is a sectional view taken on the line 4—4 of FIG. 1;
FIG. 4A is a sectional view taken along the line 404 of FIG. 1 showing the slats of the sieve in a closed position;
FIG. 5 is a fragmentary perspective view of the chaffer, showing one of the slats of the chaffer in open position;
FIG. 6 is an enlarged fragmentary view of FIG. 2;
FIG. 7 is an enlarged fragmentary view of FIG. 5; and
FIG. 8 is an exploded fragmentary view showing the method of attaching the link shown in FIG. 6.

In accordance with the present invention, the chaffer slats 17 are provided with a plurality of tines 18 which project upwardly from the plane of the chaffer. As the grain and chaff flow from left to right in FIG. 4, the tangled chaff is broken up by the tines 18, thereby loosening the grain, and the chaff is carried up and over the openings of the sieve, thereby allowing the grain to fall through the openings to be collected by suitbale collection means.

Turning now to a more detailed description, the numeral 10 designates the chaffer or sieve assembly generally. The chaffer has a perimetric frame 11 comprised of ends 11a and 11c and sides 11b and 11d, all of which are L-shaped in cross section. The sides 11b and 11d define the longitudinal direction of the chaffer, and the grain and chaff flow from the feed end 11c to the discharge end 11a. Attached to the end 11a of the frame by means of the hold-down bar 14 and screws 15 is a conventional tailing sieve 12 consisting of spaced-apart teeth 13.

Journaled in the sides 11b and 11d of the frame are rods 16 (see FIG. 5). Additional support may be given the rods 16 by passing them through longitudinally extending supports 19 and 20 which are attached to the ends 11c and 11a of the frame 11.

Attached to the rods 16 are slats 17 which are notched or serrated on their upper edges to provide points or fingers 17d, as shown more clearly in FIG. 5. If the supports 19 and 20 are used, the slats 17 will be composed of three sections 17a-c. Attached to certain slats, and more particularly to the points 17d thereof, are tines 18. The tines 18 may be soldered or welded to the points 17d, or attached in any other suitable manner to the bottom side of the points 17d.

In a preferred embodiment, as shown, the tines 18 are in the form of short rods which are mounted at an inclination to project upwardly above the chaffer and also rearwardly toward the discharge end. The action of the tines can be further improved by providing an outer end portion 18a which extend primarily in a rearward direction and more nearly parallel with respect to the plane of the chaffer bed. Preferably, the tines are arranged in rows, such as a, b, c, and d, and are distributed over the entire chaffer bed, being spaced apart laterally by intervening points 17d and longitudinally by intervening slats 17. In the illustration given, only every sixth slat is equipped with the tines, and within a tine-equipped slat, the tines are on alternate points. It is to be understood, however, that more or less rows of tines 18 may be used and within each row of tines the tines may be separated by more than one point 17d without varying from the scope of the invention.

Each of the rods 16 has a rocker arm portion 16a, as shown in FIGS. 7 and 2. Extending transversely to the slats 17 is an actuating lever 21. The lever 21 has notches or slots 21a which receive the rocker arms 16a of the rods 16. A link 22 is attached at one end thereof to the lever 21 by means of a bolt 23 and an L bracket 24, as can be seen in FIGS. 6 and 8. A bell crank 25 is pivotally connected to the other end of the link 22, and the bell crank 25 is itself pivotally secured to the end 11a of the frame 11 by means of a bolt 26 and an L bracket 27.

A chaff guard 28 may be attached to the support 20 above the rocker arms 16a, and grain deflectors 29 and 30 may be attached to the sides 11b and 11d, respectively, of the frame 11 by the screws 31.

Operation

The chaffer sieve 10 can be mounted in the cleaning shoe of any conventional combine or thresher, and thus the combine is not shown in the drawings. After the grain is cut and passes through the threshing cylinder and concave of the thresher, it is deposited on the feed end of the chaffer which is defined by the end 11c of the frame 11. The chaffer sieve is inclined somewhat downwardly from the feed end, and conventional reciprocating means may be provided in order to impart to the chaffer sieve a vibrating movement which will cause the grain and chaff to move from the feed end 11c toward the discharge end 11a. A conventional wind blower may also be provided which will blow air upwardly through the bottom of the chaffer, thereby carrying away loose chaff and other foreign materials which are lighter than grain. Such conventional reciprocating and blowing means may be seen, for example, in United States Patent No. 2,214,277 granted to Hunt et al. on Sept. 10, 1940.

As the grain and chaff pass over the chaffer in their movement toward the discharge end, the tines 18 will break up the tangled bunches of grain, chaff, and other foreign materials such as lint, hemp, or straw which are found in grasses and flax. In so doing, the tines 18 help to separate the grain from the chaff. In the past, however, even though the grain and chaff might somehow become separated, the tangled bunches of chaff frequently clogged the sieve and prevented the grain from passing through the sieve so that it might be collected. However, in applicant's structure the chaff is carried up and away from the openings in the sieve by the tines 18 and is then supported in a raised position by the end portions 18a of the tines 18. Thus, the grain is allowed to fall freely between the slats 17, to be collected by a conventional grain auger or trough (not shown). Also, by keeping the openings of the sieve free of chaff, the air blown from the wind blower is allowed to pass upwardly through the sieve to carry away loosened chaff.

The tines 18 may be raised or lowered in order to suit any flow of grain and chaff that might be passing over the chaffer. This adjustment may be accomplished by swinging the bell crank 25. As the bell crank pivots, the link 22 is moved either toward or away from the discharge end 11a, thereby causing the lever 21 to move in a longitudinal direction. Movement of the lever 21 causes the rocker arms 16a of the rods 16 to swing, thus pivoting the rods 16 which are journaled in the sides 11b and 11d. As the journaled rods 16 pivot, the attached slats 17 rotate. Thus, the tines 18, which are attached to the slats 17, may be moved from the raised position as shown in FIG. 4 to the lowered position as shown in FIG. 4A. The tines may be set in either the raised or lowered position, or in any intermediate position, by tightening the bolt 26, thereby locking the bell crank 25. The tines 18 may be set in the lowered position in order to hold the grain and chaff more evenly on the chaffer on windy days and while the thresher is traveling on slopes or rough ground. The tines may be set in the raised position if the chaff is especially coarse and bunched together.

As the rods 16 rotate, the distance between the slats 17 also changes. For finer grain and chaff, the slats may be set in the closed position as shown in FIG. 4A, thereby providing maximum screening effect.

The points 17d of the slats 17 act much in the manner of a rake to provide further separation of grain from chaff. The chaff guard 28 prevents chaff from passing through the separation between slat portions 17b and 17c, where the rocker arm portions 16a of the rods 16 are located. The grain deflectors 29 and 30 are inclined downwardly toward the center of the chaffer and prevent grain from falling over the sides 11b and 11d of the chaffer.

The vibrating movement of the chaffer eventually causes the chaff to pass over the discharge end 11a and onto the tailing sieve 12. This chaff may contain some unseparated grain, and the tailing sieve allows this grain, together with some unseparated chaff, to pass downwardly where it may be collected and returned to the feed end of the chaffer sieve.

From the foregoing, it may be seen that a unique and novel chaffer sieve has been provided which minimizes grain loss by providing for rows of tines which operate both to separate grain and chaff and to carry the chaff up and away from the openings in the chaffer sieve, thereby unclogging the openings in the sieve to allow passage of loosened grain and to allow the upward movement of air blown from the wind blower to carry away chaff.

While in the foregoing specification a detailed embodiment of the invention is set forth, it is to be understood that many of the details herein given may be varied considerably without departing from the spirit and scope of the invention.

I claim:
1. In a chaffer sieve assembly including a perimetric frame providing a longitudinally extending bed having a forward feed end and a rearward discharge end, a plurality of slats pivotally mounted on said frame and extending across said bed in parallel, spaced-apart alignment, said slats being inclined rearwardly and upwardly and the rear edges thereof being serrated to provide points, some of said slats being tine-bearing slats, a plurality of tines, each of said tines being mounted on a tine-bearing slat in alignment with a point thereof, said tines being separated transversely along a tine-bearing slat by at least one point, said tine-bearing slats being longitudinally spaced by at least one non-tine-bearing slat, each of said tines including a first portion extending from the associated point in general alignment therewith and a second portion angularly inclined with respect to said first portion and extending rearwardly and generally parallel with respect to the plane of the chaffer bed.

2. The structure of claim 1 in which said tines are attached to alternate points of the tine-bearing slats.

3. The structure of claim 1 in which said tine-bearing slats are longitudinally spaced by about five non-tine-bearing slats.

References Cited
UNITED STATES PATENTS

| | | | |
|---|---|---|---|
| 18,444 | 10/1857 | Gaar | 209—397 |
| 104,799 | 6/1870 | Vandegrift | 209—314 X |
| 485,997 | 7/1891 | Closz | 209—314 X |
| 1,461,144 | 7/1923 | Hanneman | 209—320 |
| 2,253,296 | 8/1941 | Holtzman | 209—394 |
| 2,883,052 | 4/1959 | Shovlain | 209—394 |

HARRY B. THORNTON, *Primary Examiner.*

R. HALPER, *Assistant Examiner.*